United States Patent

Hsu et al.

Patent Number: 6,154,754
Date of Patent: Nov. 28, 2000

[54] AUTOMATIC SYNTHESIS OF SEMANTIC INFORMATION FROM MULTIMEDIA DOCUMENTS

[75] Inventors: Liang-Hua Hsu, Robbinsville; Peiya Liu, East Brunswick, both of N.J.

[73] Assignee: Siemens Corporate Research, Inc., Princeton, N.J.

[21] Appl. No.: 08/936,886

[22] Filed: Sep. 25, 1997

[51] Int. Cl.$^7$ .......................... G06F 17/30; H03M 13/00
[52] U.S. Cl. ............................................. 707/513; 714/746
[58] Field of Search ..................................... 707/513, 514, 707/515, 501, 502, 802; 345/433, 435; 382/294, 173, 197; 714/746, 723, 773

[56] References Cited

U.S. PATENT DOCUMENTS

| | | | |
|---|---|---|---|
| 4,723,210 | 2/1988 | Barker et al. | 364/300 |
| 4,723,211 | 2/1988 | Barker et al. | 364/300 |
| 5,193,192 | 3/1993 | Seberger | 395/700 |
| 5,416,849 | 5/1995 | Huang | 382/173 |
| 5,490,061 | 2/1996 | Tolin et al. | 364/419.02 |
| 5,544,077 | 8/1996 | Hershey | 364/570 |
| 5,625,711 | 4/1997 | Nicholson et al. | 382/224 |
| 5,628,008 | 5/1997 | Hayashi | 395/603 |
| 5,708,825 | 1/1998 | Sotomayor | 395/762 |
| 5,729,637 | 3/1998 | Nicholson et al. | 382/282 |
| 5,794,257 | 8/1998 | Liu et al. | 707/501 |
| 5,838,837 | 11/1998 | Hirosawa et al. | 382/284 |
| 5,848,386 | 12/1998 | Motoyama | 704/5 |
| 5,850,480 | 12/1998 | Scalnlon | 382/229 |
| 5,883,986 | 3/1999 | Kopec et al. | 382/310 |
| 5,893,109 | 4/1999 | DeRose et al. | 707/104 |
| 5,907,837 | 5/1999 | Ferrel et al. | 707/3 |
| 5,909,678 | 6/1999 | Bergman et al. | 707/4 |
| 5,933,531 | 8/1999 | Lorie | 382/229 |

OTHER PUBLICATIONS

Lori Mitchell et al Reading what you sow. InfoWorld, Jul. 1996.
Peiya Liu et al Towards Automating the Creation of Hypermedia Service Manuals by Compiling Specification, 1994.
ISO 8879–1986(E) SGML reference, 1986.
Alfered V. Aho Compilers Principles, Techniques, and Tools Addion–Wesley, 1986.

*Primary Examiner*—Joseph H. Feild
*Assistant Examiner*—Alford W. Kindred
*Attorney, Agent, or Firm*—Donald B. Paschburg

[57] ABSTRACT

A system for automatically synthesizing semantic information units from raw material extracted from non-textual documents supports error detection and correction, allows mapping from pieces of raw information extracted from the media into semantic information entities in the application domain and provides a complete procedure for building up hierarchical information structures for non-textual media. It adopts a formal specification to describe the synthesis process of constructing semantic media structures for all different media in multimedia documentation. The system includes an error corrector for receiving raw AIU's and for providing corrected raw AIU's. A primitive identifier receives the corrected raw AIU's and provides primitives. A basic synthesizer receives the primitives and provides basic objects. An abstract synthesizer receives the basic objects and provides abstract objects which are in condition for the hyperlinking process.

19 Claims, 15 Drawing Sheets

```
error correction: <modifier> {
    rule <name>: <description> {
        input {
            aiu {
                <content pattern specification>
            }
        }
        output {
            aiu {
                <content pattern specification>
            }
        }
    }
    . . .
}
primitive identification : <modifier> {
    rule <name> : <description> {
        . . .
    }
    . . .
}
basic synthesis : <modifier> {
    rule <name> : <description> {
        . . .
    }
    . . .
}
abstract synthesis : <modifier> {
    rule <name> : <description> {
        . . .
    }
    . . .
}
```

Figure 4

```
<!ELEMENT  AIU    - -   ((#PCDATA)+) >
<!ATTLIST  AIU
           Class        CDATA          #IMPLIED
           Type         CDATA          #IMPLIED
           Name         CDATA          #IMPLIED
           Bounds       CDATA          #IMPLIED
           Color        CDATA          #IMPLIED
           • • •
>
```

Figure 5

```
<AIU  Class = "Raw"  Type= "Text"  Name = "N0001"
      Bounds = "103,200,203,220">
      MBN11
</AIU>

<AIU  Class = "Raw"  Type = "Text"  Name = "N0002"
      Bounds = "103,250,203,270">
      CQ001
</AIU>
```

Figure 6

```
rule <name> : <description> {
    input {
        aiu {                                    -- Raw AIU with expected syntax
            <content pattern specification>      -- Pattern of expected syntax
        }
    }
    output {                                     -- Optional
        aiu {                                    -- Corrected Raw AIU
            <content pattern specification>
        }
    }
}
```

Figure 7

```
error correction : Filter {
    rule R001 : "Part numbers" {
        input {
            aiu {
                {[0-9][0-9][0-9][0-9][0-9]/%s};
            }
        }
        output {                                    -- Optional
            aiu {
                &s;
            }
        }
    }
    rule R002 : "Part numbers plus subpart positions" {
        input {
            aiu {
                {[0-9][0-9][0-9][0-9][0-9] " " [0-9][0-9][0-9]/%s};
            }
        }
        output {                                    -- Optional
            aiu {
                &s;
            }
        }
    }
}
```

Figure 8

```
rule <name> : <description> {
    input {
        aiu {                                    -- Raw AIU with syntax errors
            <content pattern specification>      -- Pattern of invalid syntax
        }
    }
    output {
        aiu {                                    -- Raw AIU with corrected syntax
            <content pattern specification>      -- Pattern of corresponding valid syntax
        }
    }
}
```

```
rule R003 : "Remove an extra trailing character" {
    input {
        aiu {
            {[0-9][0-9][0-9][0-9][0-9]/%x} "~";
        }
    }
    output {
        aiu {
            &x;
        }
    }
}
```

Figure 11

```
rule <name> : <description> {
    input {
        aiu {                                        -- Corrected Raw AIU
            <attribute pattern specification>
            <content pattern specification>
        }
    }
    output {
        aiu {                                        -- Primitive AIU
            <attribute pattern specification>
            <content pattern specification>
        }
    }
}
```

Figure 12

```
rule R101 : "Component KKS number" {
    input {
        aiu {
            attributes {
                Class = "CorrectedRaw"; Type = "Text"; Name = "%v";
                Bounds="%x1,%y1,%x2,%y2";
            }
            {[A-Z][A-Z][0-9][0-9][0-9]/%kks};
        }
    }
    output {
        aiu {
            attributes {
                Class = "Primitive"; Type = "ComponentKKS"; Name = "&v";
                Bounds = "&x1,&y1,&x2,&y2";
            }
            &kks;
        }
    }
}
rule R102 : "System KKS number" {
    input {
        aiu {
            attributes {
                Class = "CorrectedRaw"; Type = "Text"; Name = "%v";
                Bounds = "%x1,%y1,%x2,%y2";
            }
            MBN{[0-9][0-9]/%kks};
        }
    }
    output {
        aiu {
            attributes {
                Class = "Primitive"; Type = "SystemKKS"; Name = "&v";
                Bounds = "&x1,&y1,&x2,&y2";
            }
            MBN&kks;
        }
    }
}
```

Figure 13

```
rule <name> : <description> {
    input {
        aiu {
            <attribute pattern specification>
            <content pattern specification>
        }
    }
    if <logical expression> {
        output {
            aiu {
                <attribute pattern specification>
                <content pattern specification>
            }
        }
    }
}
```

Figure 15

```
rule R201 : "Component" {
    input {
        aiu {
            attributes {
                Class = "Primitive"; Type = "SystemKKS"; Name = "%v1";
                Bounds = "%x1,%y1,%x2,%y2";
            }
            MBN{[0-9][0-9]/%syskks};
        }
        aiu {
            attributes {
                Class = "Primitive"; Type = "ComponentKKS"; Name = "%v2";
                Bounds = "%x3,%y3,%x4,%y4";
            }
            {[A-Z][A-Z][0-9][0-9][0-9]/%compkks};
        }
    }
    if (abs(&x1 - &x3) <= 5) and (abs(&y1 - &y3) <= 20)) {
        output {
            aiu {
                attributes {
                    %x5 := (&x1 - &x3) >= 0 ? &x3 : &x1;    %y5 := &y1;
                    %x6 := (&x2 - &x4) >= 0 ? &x2 : &x4;    %y6 := &y4;
                    Class = "BasicObject"; Type = "Component"; Name = "&v1_&v2";
                    Bounds = "&x5,&y5,&x6,&y6";
                }
                MBN&syskks_&compkks;
            }
        }
    }
}
```

Figure 16

```
rule <name> : <description> {
    input {
        forall  <list of variables>  {
            aiu {
                <attribute pattern specification>
                <content pattern specification>
            }
        }
    }
    output {
        aiu {
            <attribute pattern specification>
            <content pattern specification>
        }
    }
}
```

Figure 17

```
rule R301 : "System" {
    input {
        forall v, x1, y1, x2, y2, syskks, compkks {
            aiu {
                attributes {
                    Class = "BasicObject"; Type = "Component"; Name = "%v";
                    Bounds = "%x1,%y1,%x2,%y2";
                }
                MBN{[0-9][0-9]/%syskks}_{[A-Z][A-Z][0-9][0-9][0-9]/%compkks};
            }
        }
    }
    output {
        aiu {
            attributes {
                %xm := min(&x1);   %m := min(&y1);
                %xn := max(&x2);   %yn := max(&y2);   % vn := unique_id("N");
                Class = "AbstractObject"; Type = "Component"; Name = "&vn";
                Bounds = "&xm,&ym,&xn,&yn";
            }
            MBN{[0-9][0-9]/&syskks};
        }
    }
}
```

Figure 18

AUTOMATIC SYNTHESIS OF SEMANTIC INFORMATION FROM MULTIMEDIA DOCUMENTS

BACKGROUND OF THE INVENTION

1. Field of the Invention

The present invention relates to hyperlinking multimedia documents and more particularly to a synthesis process of constructing semantic media structures for all different media in media documentation.

2. Description of the Prior Art

In the recent years, hypermedia has become increasingly important in many applications, ranging from browsing of consumer-type information over Internet, to learning serious subjects such as mathematics and science, and to retrieving important technical documents for engineering purposes. Typically, documents in different media (including text, graphical images, schematic diagrams, CAD drawings, audio, video, etc.) are identified and linked together manually so that, when browsing one document, related documents can be easily retrieved. Since textual documents are usually represented in the ASCII format, further processing can be performed manually or automatically to identify words and phrases to be linked to other textual and non-textual documents. In addition, by using a markup language such as SGML (SGML, ISO 8879:1986 Text and Office Systems—Standard Generalized Markup Language, Geneva, 1986), textual documents can be structured semantically for a specific application domain and can be processed and linked more precisely to other textual and non-textual documents automatically. This is described by Peiya Liu, Ken Hampel, and Arding Hsu in "Towards Automating the Creation of Hypermedia Service Manuals by Compiling Specifications", *Proc. of Intl Conf. on Multimedia Computing and Systems*, IEEE Computing Soc. Press, 1994., pp. 203–212.

Processing of non-textual documents, however, has not been as successful because the representation of non-textual documents is often in bit and byte sequences and optionally with complex compression schemes, which provide very limited semantic information of the subject matter. In order to make better use of non-textual documents in hypermedia applications, graphics and image processing techniques are often applied to manipulate and extract relevant information from these types of media. In general, pieces of information that can be identified precisely (and extracted manually or automatically) in textual or non-textual media are referred to as AIU's (Anchorable Information Units). AIU's can be used to relate to one another in the same document or between two different documents.

State-of-the-art graphics and image processing techniques are often developed in very specific application domains such as medical imaging, OCR (Optical Character Recognition) in document processing. Some of the techniques have been modified and applied to extracting AIU's in non-textual media such as schematic diagrams and CAD drawings for technical documents. These approaches represent the first step towards the automated process of extracting information. However, they basically deal with only raw text and polylines, which are not sufficient to support more precise hyperlinking for various technical tasks such as inspection, maintenance, troubleshooting, etc.

SUMMARY OF THE INVENTION

The present invention is a system for automatically synthesizing semantic information units from raw material extracted from non-textual documents. It supports error detection and correction, allows mapping from pieces of raw information extracted from the media into semantic information entities in the application domain and provides a complete procedure for building up hierarchical information structures for non-textual media. It adopts a formal specification to describe the synthesis process of constructing semantic media structures for all different media in multimedia documentation. With this system, non-textual documents can be further processed and their content can be accessible and represented in a similar format to that of SGML structures from textual documents. This provides single unique semantically-rich information structures to the hyperlinking process in multimedia applications.

The present invention includes an error corrector for receiving raw AIU's and for providing corrected raw AIU's. A primitive identifier receives the corrected raw AIU's and provides primitives. A basic synthesizer receives primitives and provides basic objects. An abstract synthesizer receives basic objects and provides abstract objects which are in condition for the hyperlinking process.

BRIEF DESCRIPTION OF THE DRAWINGS

FIG. 4 illustrates the AIU structure synthesis specification of the present invention.

FIG. 5 illustrates an AIU definition.

FIG. 6 illustrates examples of raw AIU's.

FIG. 7 illustrates the error detection and correction specification of the present invention.

FIG. 8 illustrates examples of filter patterns.

FIG. 11 illustrates an example of transforming syntax errors.

FIG. 12 illustrates the primitive identification specification of the present invention.

FIG. 13 illustrates examples of primitive identification.

FIG. 15 illustrates a logical expression to control output patterns.

FIG. 16 illustrates an example of synthesizing a basic object.

FIG. 17 illustrates grouping an arbitrary number of objects.

FIG. 18 illustrates an example of synthesizing an abstract object.

DETAILED DESCRIPTION OF THE INVENTION

The present invention is a system that synthesizes semantic information units, called AIU structures, for non-textual documents. This system builds up semantically-rich AIU structures from the raw information extracted with graphics and imaging techniques. In order to provide a unique interface to the hyperlinking process, the AIU structures are also represented in SGML. Consequently, textual and non-textual documents can be further processed in exactly the same way, and hyperlinked to one another in a unified manner.

Figure 1:
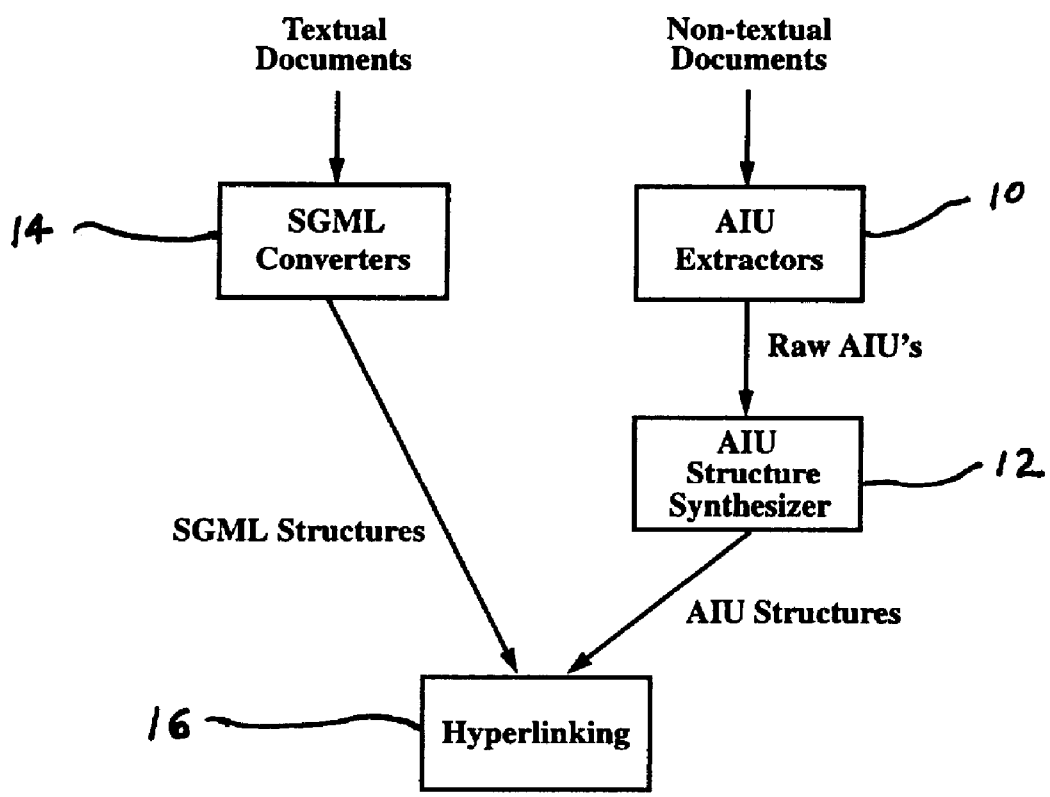
FIG. 1 illustrates automatic synthesis of semantic information from multimedia documents.

FIG. 1, which illustrates hyperlinking of SGML/AIU structures, shows that a non-textual document is first processed by a media-specific AIU extractor 10, and raw AIU's are extracted. An AIU structure synthesizer 12 is then applied to the raw AIU's to construct AIU structures for the non-textual document in the application domain. Textual documents are fed through SGML converters 14 to derive SGML structures. Since both textual documents and (the AIU structures of) non-textual documents are represented in SGML, hyperlinking 16 deals with only the SGML format. The AIU synthesizer 12 can be applied as a separate tool or integrated as part of the AIU extractor 10. In either case, AIU synthesizer 12 generates as output an AIU structure that represents an abstraction of the given non-textual media.

Figure 2:
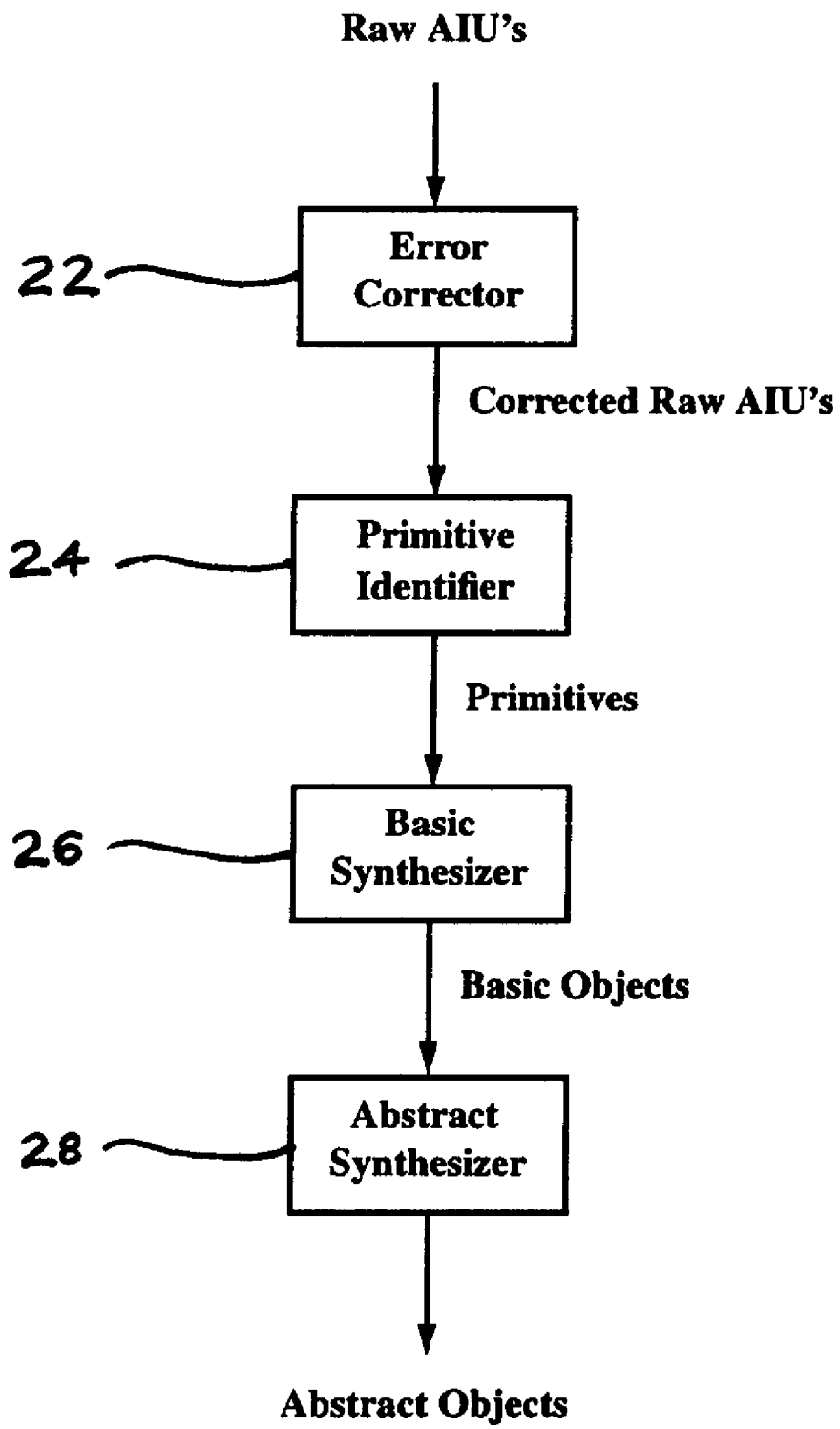
FIG. 2 illustrates the AIU structure synthesis process of the present invention.

FIG. 2 will further describe the AIU structure synthesizer 12. In general, the AIU structure synthesizer consists of four major components: error corrector 22, primitive identifier 24, basic synthesizer 26, and abstract synthesizer 28.

Error corrector 22 takes as input raw AIU's generated by the AIU extractor (10 of FIG. 1), and attempts to detect and, if possible, correct syntax errors introduced in the AIU extraction process. The output from error corrector 22 is corrected raw AIU's. Primitive identifier 24 maps the corrected raw AIU's into the primitives in an application domain. Basic synthesizer 26 groups one or more related primitives into basic objects in the application domain. Abstract synthesizer 28 groups one or more related basic objects into abstract objects and is performed recursively to construct an abstract structure for the media in the application domain.

Figure 3:
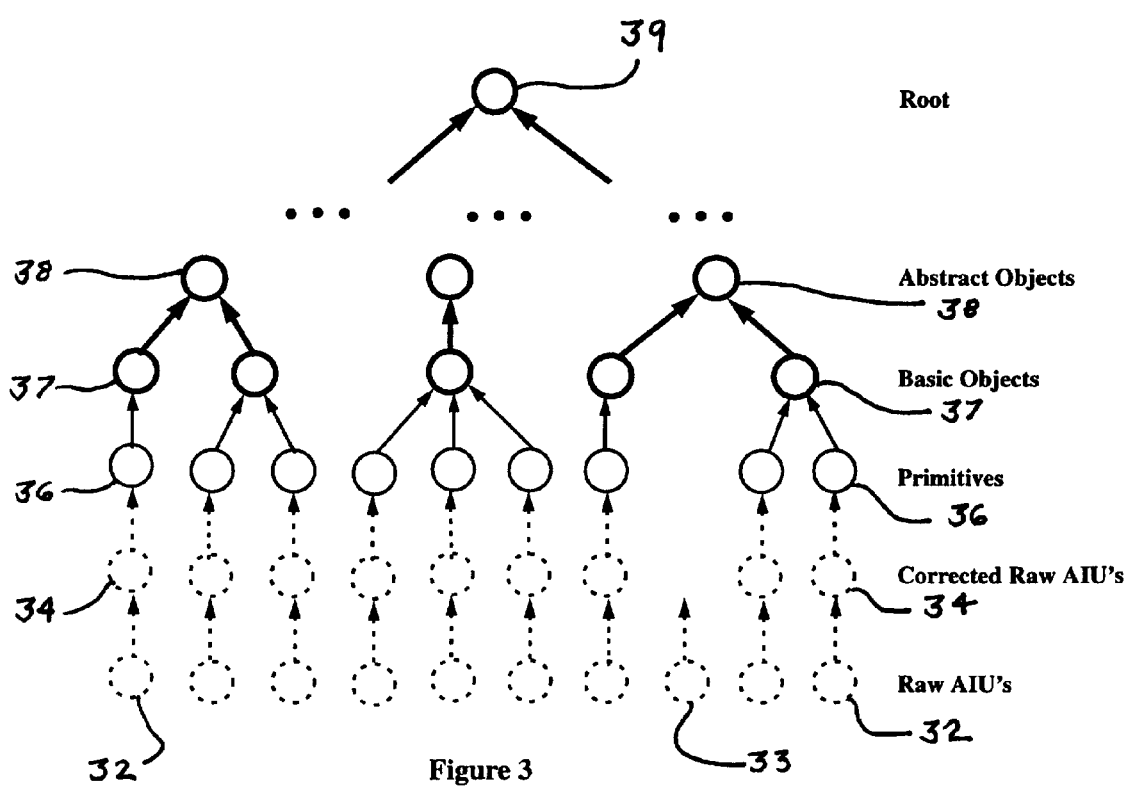
FIG. 3 illustrates the building up of AIU Structures.

FIG. 3 shows the building up of AIU structures. The AIU Synthesizer (12 of FIG. 1) implements a bottom-up process that manipulates the raw AIU's 32 generated by AIU extractor (10 of FIG. 1) and builds up a hierarchical structure of AIU objects. Some erroneous raw AIU's 33 from the AIU extractor may be discarded, while others may be corrected, or passed without changes to the next higher level. Corrected raw AIU's 34 are then mapped into primitives 36 and the primitives 36 are grouped into basic objects 37 which are further grouped into abstract objects 38 in different ways, based on the semantics of the application domain. This process continues to build up higher levels of abstraction, and finally, the root object 39 represents the highest level of abstraction of the entire media in the application domain.

Depending on the intelligence of the AIU synthesizer, at the root object, it may be concluded that a certain logic circuit has been extracted from a given scanned-in circuit diagram, or a certain machine part has been recognized from a given scanned-in mechanic drawing. To achieve such a goal, the AIU synthesizer and the underlying AIU extractor must be capable of dealing with both textual and graphic information in images.

In general, many AIU synthesizers are needed to further process the raw AIU's generated by different AIU extractors, each of which dealing with only one specific media in one application domain. However, with the present invention, a specification-based approach is taken to derive a general-purpose AIU synthesizer capable of flexibly processing the output from all media-specific AIU extractors. This generalized AIU synthesizer is controlled by an AIU Structure Synthesis Specification. In example, for each media in an application domain, an AIU structure specification is created to control the synthesis process, therefore generating an AIU structure from the raw AIU's extracted by one AIU extractor.

The AIU synthesis specification of the present invention formally describes the four synthesis components. Each component description consists of a list of rules that manipulate the set of AIU's produced by the previous component and generate a new set of AIU's for the next component. The AIU structure synthesis specification is illustrated in FIG. 4. Due to the diversity of the nature of non-textual documents, e.g., vector graphics vs. bitmaps, still images vs. motion, and visual vs. audible, some applications may require all four components of the system, while others may need only one or two components. Furthermore, for a particular component, some applications may consist of more rules than others or may need to repeat the same component with a different list of rules for more than one time.

Each rule specifies the patterns of a subset of input AIU's that are acceptable and specifies the patterns of one or more output AIU's that are to be generated. That is, when a subset of input AIU's satisfies one of the rules, the corresponding output AIU's are generated. The <name> and <description> strings in a rule specification are only for reference purpose. The body of the rule specification is described in detail below. The <modifier> string of a synthesis step is used to specify the action to be taken for input AIU's that do not satisfy any rules in the synthesis step and it can be "Filter", "Rename", or "Addition". That is, if a step is a Filter, the output set contains only the output AIU's generated by the rules; if a step is a Renaming, the output set contains the output AIU's generated by the rules plus the input AIU's that do not satisfy any rules; if a step is an Addition, the output set contains all input AIU's plus the output AIU's generated by the rules.

The definition of AIU's that are manipulated by the rules in the synthesis components is given in FIG. 5. That is, an AIU object is a sequence of one or more parsable character data and for most documents, it is simply a string of printable ASCII characters. An AIU object is also associated with a list of attributes and each attribute is a sequence of character data, which in these applications, is a string of printable ASCII characters in a pair of double-quotes. For more details on the SGML syntax, refer to SGML, ISO 8879:1986 Text and Office Systems—Standard Generalized Markup Language, Geneva, 1986.

The Class attribute can be "Raw", "CorrectedRaw", "BasicObject", or "AbstractObject". The Type attribute represents the type of an object that is identifiable by an AIU extractor, e.g., "Text", "Line", "Polyline", "Rectangle", "Arc", etc., or a domain-specific object type, based on the semantics of the application domain. For text, the Bounds attribute represents the bounding box, i.e., x and y coordinates of the upper left corner and the lower-right corner. For a graphic primitive, the Bounds attribute represents a list of locations, e.g., vertices of a polyline, and each location is a pair of x and y coordinates. The Color attribute represents the color of a graphic primitive. Additional attributes can be specified for different media in different application domains. Two examples of raw AIU's are shown in FIG. 6.

The following will describe error detection and correction. Error detection and correction is important for AIU extractors that deal with images such as scanned-in drawings, as opposed to vector graphics. Since useful information in drawings is usually labeled with text such as component id's, part numbers, signal names, etc., the main task of an image AIU extractor is to extract text from images. Typically, an image AIU extractor involves identifying text regions and executing an OCR algorithm. Since text and other graphics, such as lines, etc., can be arbitrarily intermixed and the quality of scanned-in drawings varies, erroneous text may be extracted.

The present invention includes two mechanisms to detect and, if possible, correct the syntax errors introduced in the AIU extraction processes. These two mechanisms are called Pattern Fitting and Syntactical Transformation. The pattern fitting mechanism is activated by listing the expected syntax for each type of AIU in one rule. This is shown in FIG. 7. Since technical terms on drawings usually conform to the naming conventions in the industry, it is possible to enumerate the patterns of all types of text that label useful information on the drawings. This type of rule, by default, generates corrected raw AIU's with the expected patterns as output, so depending on the implementation, the specification of the output AIU patterns may be omitted.

A <content pattern specification> is a regular expression that specifies a pattern of the content of an AIU object. Refer to A. V. Aho and J. D. Ullman, *Principles of Compiler Design,* Addison-Wesley, Reading, Mass., 1977, for the syntax of regular expressions. In a content pattern specification, a pair of "{" and "}" can be used to separate a segment of pattern (from the rest of the pattern) and a variable instantiation can be introduced by a "/" followed by a variable name that begins with a "%". That is, if a segment of an input AIU content matches a segment of the pattern, the specified variable is created and assigned with the value of the matched segment of the input AIU content. Once a value is assigned to a variable it can be used anywhere in the input and output patterns within the same rule by referencing the variable name prefixed with an "&".

Two examples of filter patterns are shown in FIG. 8. All text in the drawing must be either a five-digit number or a five-digit number followed by a space and a three-digit number. Since it is a filter, all other text that does not match either pattern and cannot be corrected is to be discarded.

Figures 9, 10:
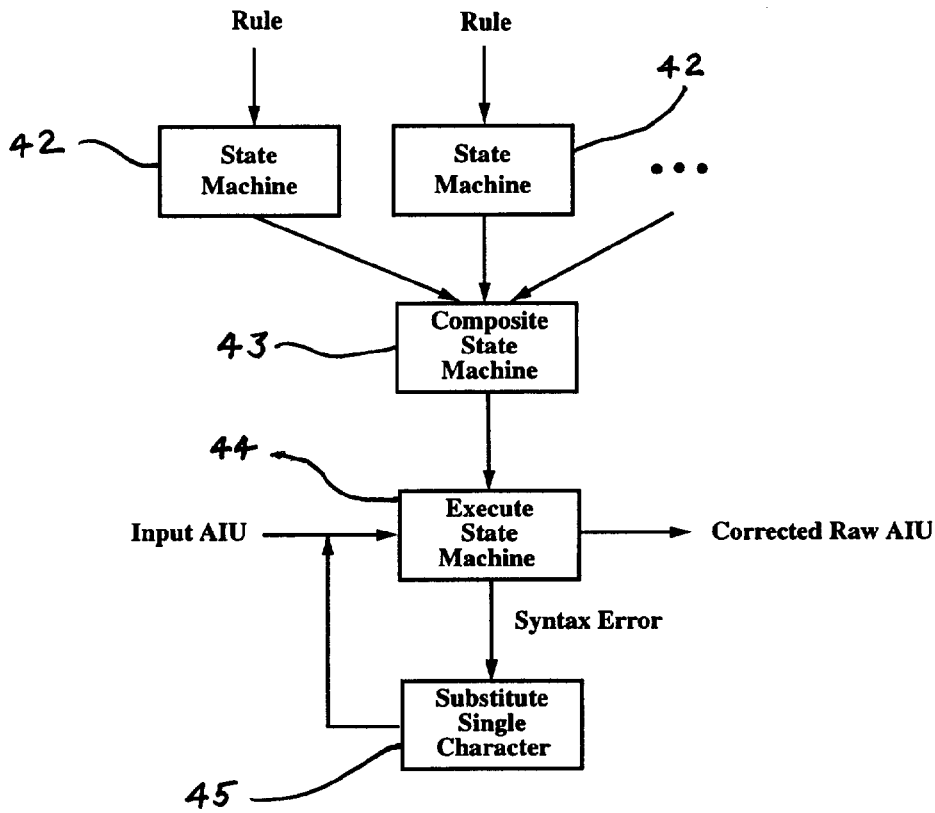
FIG. 9 illustrates pattern fitting with finite-state machines.
FIG. 10 illustrates error correction by syntactical transformation.

The pattern fitting mechanism is based on finite-state machines as described by A. V. Aho and J. D. Ullman in *Principles of Compiler Design,* Addison-Wesley, Reading, Mass., 1977. This is shown in FIG. 9. That is, each pattern specified in a rule is converted into a finite-state machine 42, and all finite-state machines are unioned to form a composite state machine 43. The process of pattern fitting is an attempt to accept an input AIU string with a composite state machine. This takes place in execute state machine 44. When a syntax error occurs, a single character substitution is applied to the input AIU string in substitute single character 45 and the process repeats until either a modified AIU string is accepted or the input AIU string is rejected. Substitution of characters in the AIU strings reflects the common errors introduced in the AIU extraction process. Typical single character substitutions are such as replacing a letter with a digit (and vice versa), removing leading and trailing character, adding a space between two characters, etc.

The syntactical transformation mechanism specifies an input pattern and if a subset of input AIU's matches the input pattern, the output patterns are generated by transforming the input patterns. For the purpose of error correction, the input patterns are known invalid syntax that are likely to occur in a particular AIU extraction process and the output patterns are the corresponding valid syntax. This is shown in FIG. 10.

An example of removing a redundant trailing character is shown in FIG. 11. A part number is usually related to a graphic object through a leading line in a drawing and depending on the spacing between the last digit of the part number and the leading line, an extra character such as "~" is often recognized. A known extra trailing character can be easily removed through a simple syntactical transformation as shown in FIG. 11.

In addition to being part of the AIU synthesizer, the error detection and correction mechanisms of the present invention can be integrated into an AIU extraction process to make it more reliable for hyperlinking and other applications. The error detection and correction mechanisms can also be used separately as a tool to verify and correct the syntax of important technical terms in SGML-based technical documents.

The following will describe the primitive identifier (22 of FIG. 2). Primitive identification is the process of assigning semantics to the information extracted by the AIU extractor (and maybe corrected by the error corrector). Typically, there is a one-to-one mapping between the corrected raw AIU's and the primitives of the media. This is shown in FIG. 12. The <attribute pattern specification> is a list of attribute specifications separated by ";", and each attribute specification is a string of characters in a pair of double-quotes. An attribute specification may include variable instantiations in a similar way as in a content pattern specification.

Some transformations of the attribute values and content patterns may also be applied to make them more appropriate for the application domain. Primitives are then used to construct AIU objects and build AIU structures in the application domain. Two examples of mapping corrected raw AIU's to machine part id's, known as the KKS numbering scheme in the power plant industry, are shown in FIG. 13. The Class and Type attributes are changed to provide the semantics to the output AIU and all other information remains intact.

Figure 14:
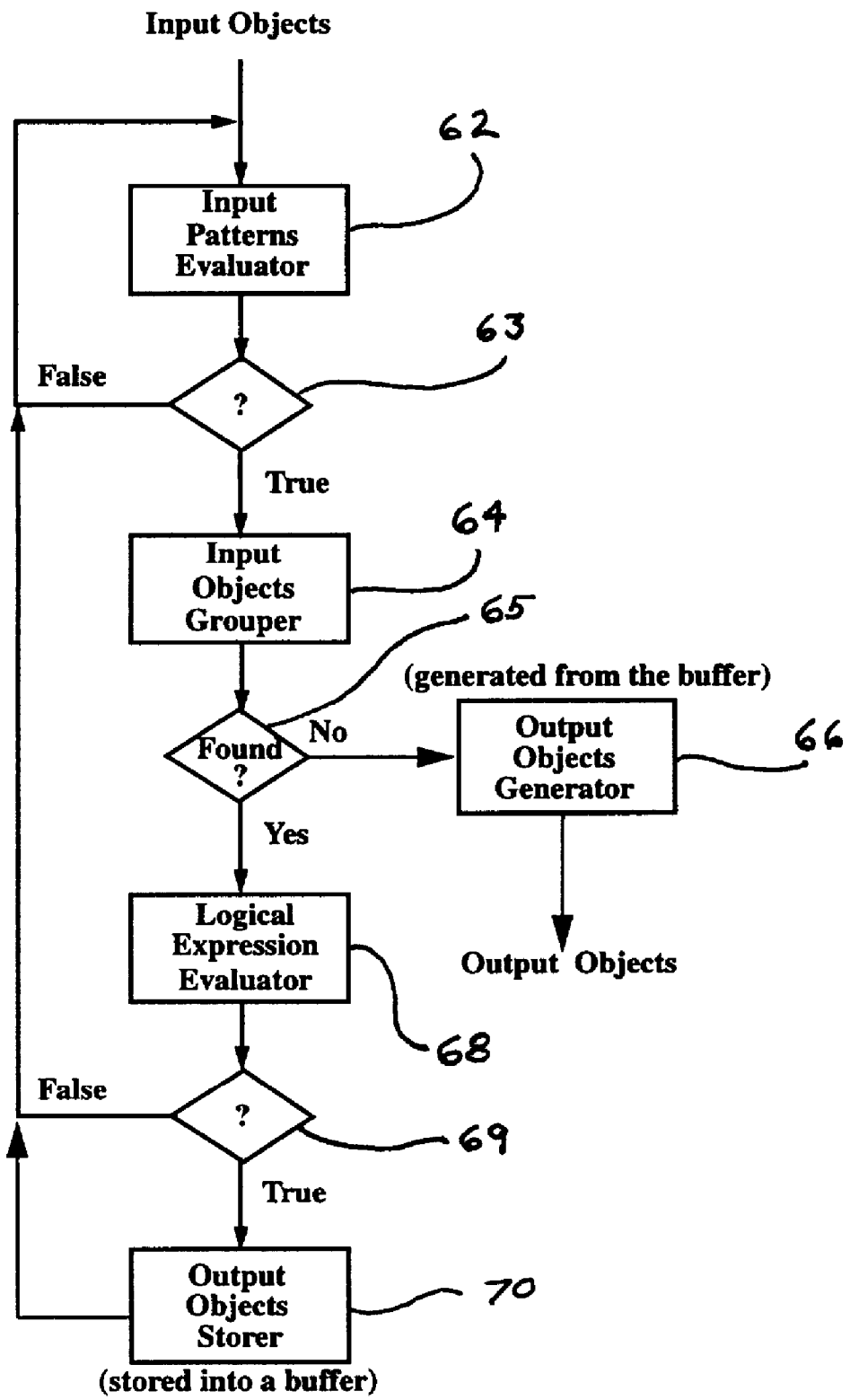
FIG. 14 illustrates synthesis of domain-specific objects.

The following will describe the basic object synthesizer (26 of FIG. 2). Synthesis of basic objects involves the grouping of primitives found in a media to form a basic semantic entity that applications can handle directly. It requires computation capabilities such as pattern matching, grouping, logical expressions and string manipulation. The process of synthesizing a domain-specific object, including both basic and abstract objects (28 of FIG. 2), is shown in FIG. 14. For synthesizing basic objects, the input is a set of primitives in the application domain and the output is a set of basic objects for the application domain.

Input AIU's are first evaluated to match the specified input patterns in input patterns evaluator 62. Decision block 63 then divides the matched input AIU's from the unmatched input AIU's. The matched input AIU's are grouped together in different ways, based on the semantics of the application domain. This is performed in input objects grouper 64. Decision block 65 then divides the output of group input objects 64 to output objects generator 66 or logical expression evaluator 68. In logical expression evaluator 68, a logical expression is evaluated on the groups of the matched input AIU's. If the above three checks are successful, a true is determined by decision block 69 and the specified output AIU's are stored in output objects storer 70. These are returned to the input of input patterns evaluator 62. The output of output objects generator 66 are included in the final set of output objects to be passed to the next synthesis step when all input AIU objects are computed.

The "if" statement, as shown in FIG. 15, consists of a logical expression and an output pattern. If the logical expression is evaluated to be True, the output pattern is generated. The logical expression is typically used to specify the relationship among the attributes and contents of the matched input objects.

An example of grouping two machine part names into a qualified name for a component is shown in FIG. 16. Input AIU's matching two specified patterns are identified and grouped together to form a subset. The if statement is used to check the relative positioning of the two input AIU's. If it evaluates to be True, the coordinates for the combined AIU are calculated and the content of the combined AIU is constructed to form an output AIU object.

The following will describe the abstract object synthesizer (28 of FIG. 2). The procedure for synthesizing abstract objects is the same as that for synthesizing basic objects except that the input AIU's are basic objects (not primitives) and more domain-specific or application-specific terms can be defined to form high-level objects. As mentioned above, the step of synthesizing abstract objects is often performed recursively to build up a hierarchical structure for an application domain.

While in all previous steps, grouping often involves only one or two objects, it depends on the semantics of the application domain, the relationship among objects that are grouped in building a domain-specific structure can be more complicated, and it may involve an arbitrary number of objects. The "forall" statement, as shown in FIG. 17, provides a mechanism to group an arbitrary number of objects, i.e., all input AIU objects that match the input patterns are grouped together. The forall statement also includes a list of variables for collecting information from the matched objects, i.e., each variable can be assigned a sequence of values which can expand arbitrarily.

An example of synthesizing a large group of objects into a high-level object is shown in FIG. 18. All component objects whose id. begins with the same system id. are grouped together to form a system object. The coordinates of all the matched component objects are stored in the sequences, x1, y1, x2, and y2. These sequences of values are then used in the output patterns to calculate the coordinates of the output object. Many built-in functions are provided to manipulate sequences of values, e.g., min, max, average, sum, etc. The "unique_id" function is for generating a unique id. prefixed with the given argument.

As stated above, the present invention includes the following:

1. A unique textual structure, called an AIU structure, is designed to represent semantic information units for non-textual documents.
2. An automatic process is designed to create AIU's from non-textual documents such as images, schematics, etc. The process consists of five steps: one AIU extraction step for creating raw AIU's and four AIU synthesis steps for creating application-specific AIU's based on AIU structure synthesis specifications.
3. An AIU structure synthesizer includes the four AIU synthesis components: Error Corrector, Primitive Identifier, Basic Synthesizer, and Abstract Synthesizer. An AIU Synthesis Specification Language is provided to formally describe the four synthesis components.
4. In each component, the AIU structure synthesis specification consists of a list of rules that manipulate the set of AIU's produced by the previous component and generate a new set of AIU's for the next component. Each rule specifies an input pattern that is acceptable and specifies an output pattern that is to be generated, i.e., when a subset of input AIU's satisfies one of the rules, the corresponding output AIU's are generated.
5. In the error corrector, an AIU structure synthesis specification takes the input patterns of the expected raw AIU syntax and generates output patterns of corrected raw AIU syntax. Two mechanisms are applied to perform error detection and correction: pattern fitting and syntactical transformation.
6. The pattern fitting mechanism is based on finite-state machines. That is, each pattern specified in a rule is converted into a finite-state machine and all finite-state machines are unioned to form a composite state machine. The process of pattern fitting is an attempt to accept an AIU string with a composite state machine. When a syntax error occurs, a single character substitution is applied to the input AIU string and the process repeats until either a modified AIU string is accepted or the input AIU string is rejected.
7. The syntactical transformation specifies an input pattern and if a subset of input AIU's matches the input pattern, the output patterns are generated by transforming the input patterns.
8. In the primitive identifier, an AIU structure synthesis specification takes syntactic attributes with input patterns as input and generates semantic attribute names and output patterns as output.
9. The basic object synthesizer involves the grouping of primitives found in a media to form a basic semantic entity that applications can handle directly. It requires computation capabilities such as pattern matching, grouping, logical expressions and string manipulation.
10. The abstract object synthesizer involves the grouping of basic AIU objects, rather than primitives, and applying more domain-specific semantics to form high-level objects.

The possibility of creating AIU structures for non-textual documents opens up a new door for hypermedia applications, i.e., graphics and images are no longer just flat files with bits and bytes. Instead, they can also be considered as content-accessible structured documents just like textual documents and can be manipulated by various tools to support advanced features for on-line query and browsing of multimedia information.

It is not intended that this invention be limited to the hardware or software arrangement, or operational procedures shown disclosed. This invention includes all of the alterations and variations thereto as encompassed within the scope of the claims as follows.

What is claimed is:

1. An AIU structure synthesizer of semantic information from multimedia non-textual documents comprising:

an error corrector for receiving raw AIU's extracted from said non-textual documents and for correcting errors in said raw AIU's;

a primitive identifier connected to said error corrector, for assigning semantics to outputs of said error corrector;

a basic synthesizer connected to said primitive identifier, for grouping related outputs of said primitive identifier; and, an abstract synthesizer connected to said basic synthesizer, for grouping related outputs of said basic synthesizer.

2. An AIU structure synthesizer of semantic information from multimedia documents as claimed in claim 1 wherein said error corrector comprises:

a plurality of state machines each state machine for receiving a pattern specified in a rule and for providing an output;

a composite state machine for unioning together each of said output from each of said plurality of state machines;

an execute state machine for providing pattern fitting by receiving input AIU's and a composite output from said composite state machine and by providing corrected raw AIU's and a syntax error; and, a substitute single character for receiving said syntax error and for providing a single character substitution to said input AIU's.

3. An AIU structure synthesizer of semantic information from multimedia documents as claimed in claim 1 wherein said primitive identifier comprises:

assign means for assigning semantics to information extracted by an AIU extractor; and, mapping means for performing a one-to-one mapping between corrected raw AIU's and primitives.

4. An AIU structure synthesizer of semantic information from multimedia documents as claimed in claim 1 wherein said basic synthesizer comprises:

an input pattern evaluator for receiving a set of primitives at an input;

a first decision block connected to an output of said input pattern evaluator for providing a false output to said input of said input pattern evaluator;

an input objects grouper connected to a true output of said first decision block;

a second decision block connected to an output of said input objects grouper;

an output objects generator connected to a no output of said second decision block for providing output basic objects;

a logical express evaluator connected to a yes output of said second decision block;

a third decision block connected to an output of said logical expression evaluator for providing a false output to said input of said input pattern evaluator; and, an output basic objects storer connected to a true output of said third decision block for providing a stored output basic object to said input of said input pattern evaluator.

5. An AIU structure synthesizer of semantic information from multimedia documents as claimed in claim 1 wherein said abstract synthesizer comprises:

an input pattern evaluator for receiving basic objects from said basic synthesizer at an input;

a first decision block connected to an output of said input pattern evaluator for providing a false output to said input of said input pattern evaluator;

an input objects grouper connected to a true output of said first decision block;

a second decision block connected to an output of said input objects grouper;

an output objects generator connected to a no output of said second decision block for providing output abstract objects;

a logical expression evaluator connected to a yes output of said second decision block;

a third decision block connected to an output of said logical expression evaluator for providing a false output to said input of said input pattern evaluator; and, an output abstract objects storer connected to a true output of said third decision block for providing a stored output abstract object to said input of said input pattern evaluator.

6. An AIU structure synthesizer of semantic information from multimedia documents as claimed in claim 1 wherein:

said error corrector attempts to detect and correct syntax errors introduced in an AIU extraction process;

said primitive identifier maps corrected raw AIU's into primitives in an application domain;

said basic synthesizer groups one or more related primitives into basic objects in said application domain; and, said abstract synthesizer groups one or more related basic objects into abstract objects and performs recursively to construct an abstract structure, wherein said error corrector, said primitive identifier, said basic synthesizer and said abstract synthesizer build up a hierarchical structure of AIU objects.

7. An AIU structure synthesizer of semantic information from multimedia documents as claimed in claim 1 wherein said error corrector comprises:

pattern fitting means based on finite-state machines; and, syntactical transformation means.

8. An AIU structure synthesizer of semantic information from multimedia documents as claimed in claim 1 wherein said basic synthesizer comprises:

pattern matching means for evaluating input AIU's to generate matched AIU's matching specified input patterns;

grouping means for generating groups of said matched AIU's;

logical expression means for evaluating logical expression on said groups of said matched AIU's; and, string manipulation means for generating a set of AIU's with specified output patterns.

9. An automatic synthesizer of semantic information from multimedia non-textual documents comprising:

SGML converters for receiving textual documents and for providing SGML structures to a hyperlinker;

AIU extractors for receiving non-textual documents and for providing raw AIU's extracted from said non-textual documents; and, an AIU structure synthesizer connected to said AIU extractors for receiving said raw AIU's and for providing AIU structures to said hyperlinker.

10. An automatic synthesizer of semantic information from multimedia documents as claimed in claim 9 wherein said AIU structure synthesizer comprises:

an error corrector for receiving said raw AIU's;

a primitive identifier connected to said error corrector;

a basic synthesizer connected to said primitive identifier; and, an abstract synthesizer connected to said basic synthesizer for providing abstract objects to said hyperlinker.

11. An automatic synthesizer of semantic information from multimedia documents as claim in claim 10 wherein said error corrector comprises:

a plurality of state machines each state machine for receiving a pattern specified in a rule and for providing an output;

a composite state machine for unioning together each of said output from each of said plurality of state machines;

an execute state machine for providing pattern fitting by receiving an input AIU and a composite output from said composite state machine and by providing a corrected raw AIU and a syntax error; and, a substitute single character for receiving said syntax error and for providing a single character substitution to said input AIU.

12. An automatic synthesizer of semantic information from multimedia documents as claimed in claim 10 wherein said primitive identifier comprises:

assign means for assigning semantics to information extracted by said AIU extractors; and, mapping means for performing a one-to-one mapping between corrected raw AIU's and primitives.

13. An automatic synthesizer of semantic information from multimedia documents as claimed in claim 10 wherein said basic synthesizer comprises:

an input pattern evaluator for receiving a set of primitives at an input;

a first decision block connected to an output of said input pattern evaluator for providing a false output to said input of said input pattern evaluator;

an input objects grouper connected to a true output of said first decision block;

a second decision block connected to an output of said input objects grouper;

an output objects generator connected to a no output of said second decision block for providing output basic objects;

a logical expression evaluator connected to a yes output of said second decision block;

a third decision block connected to an output of said logical expression evaluator for providing a false output to said input of said input pattern evaluator; and, an output basic objects storer connected to a true output of said third decision block for providing a stored output basic object to said input of said input pattern evaluator.

14. An automatic synthesizer of semantic information from multimedia documents as claimed in claim 10 wherein said abstract synthesizer comprises:

an input pattern evaluator for receiving basic objects from said basic synthesizer at an input;

a first decision block connected to an output of said input pattern evaluator for providing a false output to said input of said input pattern evaluator;

an input objects grouper connected to a true output of said first decision block;

a second decision block connected to an output of said input objects grouper;

an output objects generator connected to a no output of said second decision block for providing said abstract objects;

a logical expression evaluator connected to a yes output of said second decision block;

a third decision block connected to an output of said logical expression evaluator for providing a false output to said input of said input pattern evaluator; and, an output abstract objects storer connected to a true output of said third decision block for providing a stored output abstract object to said input of said input pattern evaluator.

15. An automatic synthesizer of semantic information from multimedia documents as claimed in claim 10 wherein said error corrector comprises:

pattern fitting means based on finite-state machines; and, syntactical transformation means.

16. An automatic synthesizer of semantic information from multimedia documents as claimed in claim 10 wherein said basic synthesizer comprises:

pattern matching means;

grouping means;

logical expression means; and, string manipulation means.

17. An automatic synthesizer of semantic information from multimedia documents as claimed in claim 9 wherein said AIU structure synthesizer implements a bottom up process that manipulates said raw AIU's from said AIU extractors and builds up a hierarchical structure of AIU objects.

18. An automatic synthesizer of semantic information from multimedia documents as claimed in claim 9 wherein said AIU structure synthesizer is specification based and therefore capable of flexibly processing outputs from all media-specific AIU extractors.

19. An automatic synthesizer of semantic information from multimedia documents comprising:

SGML converters for receiving textual documents and for providing SGML structures to a hyperlinker; and, AIU extractors and synthesizer for receiving non-textual documents and for providing AIU structures to said hyperlinker.

* * * * *